United States Patent
Takagi

(12) 
(10) Patent No.: US 6,708,046 B1
(45) Date of Patent: Mar. 16, 2004

(54) FOLDING PORTABLE TELEPHONE HAVING ENHANCED OPERABILITY

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 09/670,161

(22) Filed: Sep. 26, 2000

(30) Foreign Application Priority Data

Dec. 7, 1999 (JP) ............................................. 11-348148

(51) Int. Cl.⁷ ................................................. H04M 1/00
(52) U.S. Cl. ................................ 455/575.3; 455/575.1; 455/90.3; 279/433.01; 279/433.13
(58) Field of Search ................... 455/90.1–90.3, 455/351, 575.1–575.3, 550.1; 379/428, 428.1, 433, 433.01, 433.11, 433.13; 16/321, 326, 371, 374, 232, 342, 330, 284, 294; D14/138

(56) References Cited

FOREIGN PATENT DOCUMENTS

JP          7-313371          12/2000

Primary Examiner—Vivian Chin
Assistant Examiner—Tuan Tran
(74) Attorney, Agent, or Firm—Katten Muchin Zavis Rosenman

(57) ABSTRACT

A folding portable telephone is provided, including a first housing to be held in a hand of a user, a hinge attached to one end of the first housing, a second housing movably supported by the hinge, a damper unit incorporated into the hinge and a unidirectional clutch unit incorporated into the hinge. The unidirectional clutch unit is connected to the damper unit so as to allow the damper unit to generate given resistance with respect to a rotational movement of the second housing when the second housing is rotated in an opening direction thereof, and to prevent the damper unit from generating the given resistance with respect to the rotational movement thereof when the second housing is rotated in a closing direction thereof.

17 Claims, 9 Drawing Sheets

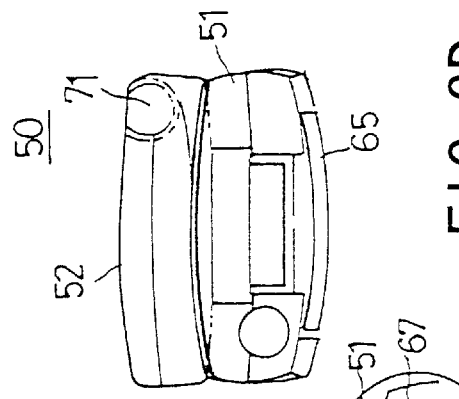
FIG. 3A
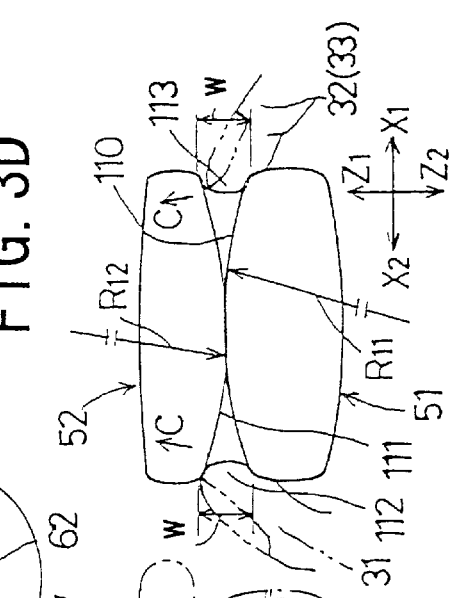
FIG. 3B
FIG. 3D
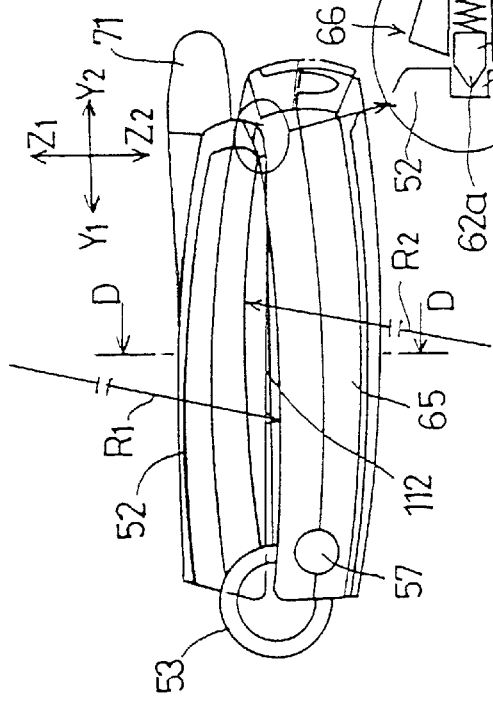
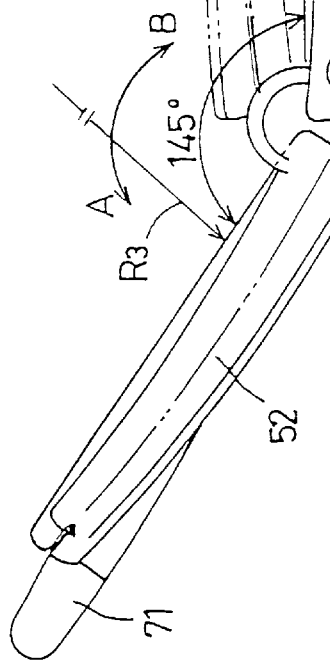
FIG. 3C

FOLDING PORTABLE TELEPHONE HAVING ENHANCED OPERABILITY

BACKGROUND OF THE INVENTION

1. Field of the Invention

The present invention generally relates to folding portable telephones, and more particularly, relates to a folding portable telephone which is folded to be carried, and is unfolded to be used to make telephone conversations.

Portable telephones are structurally divided into two types: a folding type and a so-called stick-type, which does not have a folding structure.

When folded, a folding portable telephone becomes so much smaller in size than a stick-type portable telephone that the folding portable telephone is easy to carry compared with the stick-type portable telephone. However, the folding portable telephone requires unfolding and folding actions every time a telephone conversation is made, which is not the case with the stick-type portable telephone. Therefore, the folding portable telephone is desirably structured to facilitate its unfolding and folding actions for enhanced operability thereof.

2. Description of the Related Art

FIG. 1A is a perspective view of a conventional folding portable telephone 10 folded to be carried and FIG. 1B is a perspective view of the conventional folding portable telephone 10 unfolded to make telephone conversations. The conventional folding portable telephone 10 can be automatically unfolded by pushing a button provided thereto. The conventional folding portable telephone 10 includes a first housing 11 including operation buttons 14, a second housing 12 including a display section and a hinge 13 connecting the first and second housings 11 and 12. The first housing 11 includes the operation buttons 14 and a microphone 15. The second housing 12 includes a liquid crystal panel 16 as the display section, an antenna 17 and a speaker 18. A hinge module 19 and an oil damper 20 are incorporated into the hinge 13. A button 21 is provided close to the hinge 13 on a side 11a of the first housing 11.

When not in use, the conventional folding portable telephone 10 is folded as shown in FIG. 1A with the second housing 12 coupled to the first housing 11 by a lock claw 22.

On the other hand, when a user makes telephone conversations, the user holds the first housing 11 of the conventional folding portable telephone 10 in the palm of a left hand 30, and pushes the button 21 with a thumb 31 of the left hand 30. By this operation, the lock claw 22 is moved back inside by a rotation lever 23 to release the lock on the second housing 12, so that the second housing 12 is rotated with respect to the first housing 11 by a spring 19a in the hinge module 19 in an opening direction indicated by the arrow A shown in FIG. 1B. As a result, the second housing 12 is opened by approximately 145 degrees up from the first housing 11. The oil damper 20 allows the second housing 12 to be opened slowly. Then, the user stretches out the antenna 17 and talks on the unfolded conventional folding portable telephone 10 brought close to the face with the speaker 18 touching the ear.

When the telephone conversations are over, the user manually retracts the antenna 17 and rotates the second housing 12 in a closing direction indicated by the arrow B shown in FIG. 1B until the second housing 12 is coupled to the first housing 11 by the lock claw 22. In this way, the conventional folding portable telephone 10 is folded as shown in FIG. 1A.

The oil damper 20 functions also in the case of rotating the second housing 12 in the closing direction. Therefore, the closing action of the second housing 12 is made against the viscous force of the oil damper 12, preventing the second housing 12 from being quickly closed. Thus, the operability of the conventional folding portable telephone 10 is not considered good enough.

The lock on the second housing 12 of the folded conventional folding portable telephone 10 is released not only by pushing the button 21 as previously described, but also by forcibly rotating the second housing 12 to some extent with respect to the first housing 11. The button 21 is pushed with the thumb of the left hand 30 of the user holding the conventional folding portable telephone 10 in the palm thereof. However, the user has to use both hands to forcibly rotate the second housing 12 with respect to the first housing 11. This is another reason why the operability of the conventional folding portable telephone is not considered sufficient.

SUMMARY OF THE INVENTION

It is a general object of the present invention to provide a folding portable telephone in which the above disadvantages are eliminated.

A more specific object of the present invention is to provide a folding portable telephone which allows its folding action to be made quickly with little force.

The above objects of the present invention are achieved by a folding portable telephone including a first housing to be held in a hand of a user, a hinge attached to one end of the first housing a second housing movably supported by the hinge, a damper unit incorporated into the hinge and a unidirectional clutch unit incorporated into the hinge, wherein the unidirectional clutch unit is connected to the damper unit so as to allow the damper unit to generate given resistance with respect to a rotational movement of the second housing when the second housing is rotated in an opening direction thereof, and to prevent the damper unit from generating the given resistance with respect to the rotational movement thereof when the second housing is rotated in a closing direction thereof.

According to the above-mentioned structure, the folding portable telephone can be quickly folded with little force as the damper unit does not function in the folding action of the folding portable telephone.

The above objects of the present invention are also achieved by a folding portable telephone including a first housing to be held in a hand of a user, a hinge attached to one end of the first housing, a second housing movably supported by the hinge, a damper unit incorporated into the hinge, a unidirectional clutch unit incorporated into the hinge, a lock mechanism which provides a lock on the second housing to keep the second housing closed down to said first housing, the lock being released when said second housing is pried open, a spring which presses the second housing in an opening direction thereof, and a space between each of corresponding longitudinal sides of the first and second housings when the folding portable telephone is folded so that the second housing is pried open by inserting a finger of the user into each of the spaces, wherein the unidirectional unit is connected to the damper unit so as to allow the damper unit to generate given resistance with respect to a rotational movement of the second housing when the second housing is rotated in an opening direction thereof, and to prevent the damper unit from generating the given resistance with respect to the rotational movement thereof when the second housing is rotated in a closing direction thereof.

The above objects of the present invention are also achieved by a folding portable telephone including a first housing to be held in a hand of a user, a hinge attached to one end of the first housing, and a second housing movably supported by the hinge, wherein a space is formed between each of corresponding longitudinal sides of the first and second housings when the folding portable telephone is folded so that the second housing is pried open by inserting a finger of the user into each of the spaces.

The above objects of the present invention are further achieved by a folding portable telephone including a first housing to be held in a hand of a user, a hinge attached to one end of the first housing, a second housing movably supported by the hinge, a lock mechanism which provides a lock on the second housing to keep the second housing closed down to the first housing, the lock being released when the second housing is pried open, and a spring which presses the second housing in an opening direction thereof, wherein each of the first and second housings is shaped like an arc so as to form a space between each of corresponding longitudinal sides of the first and second housings when the folding portable telephone is folded so that the second housing is pried open by inserting a finger of the user into each of the spaces.

BRIEF DESCRIPTION OF THE DRAWINGS

Other objects, features and advantages of the present invention will become more apparent from the following detailed description when read in conjunction with the accompanying drawings, in which:

FIGS. 3A and 3B are a side elevational view and a front elevational view, respectively, of the folding portable telephone of FIG. 2A;

FIG. 3C is a side elevational view of the folding portable telephone of FIG. 2B;

FIG. 3D is a cross-sectional view of the folding portable telephone of FIG. 3A taken along the line D—D;

DETAILED DESCRIPTION OF THE PREFERRED EMBODIMENTS

A description will now be given, with reference to the accompanying drawings, of embodiments of the present invention.

Figure 1A:
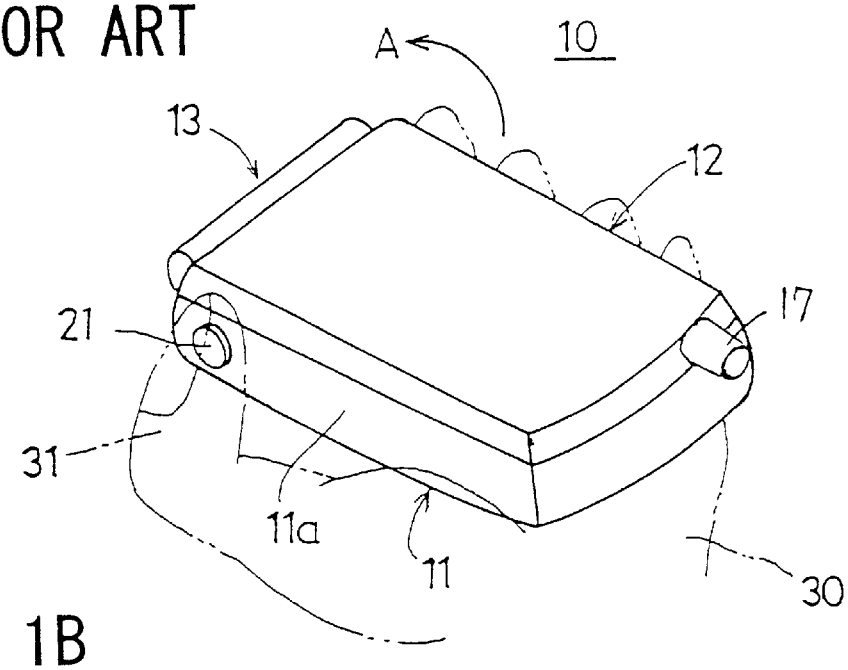
FIGS. 1A and 1B are perspective views of a conventional folding portable telephone in a folded state and in an unfolded state, respectively.
Figure 1B:
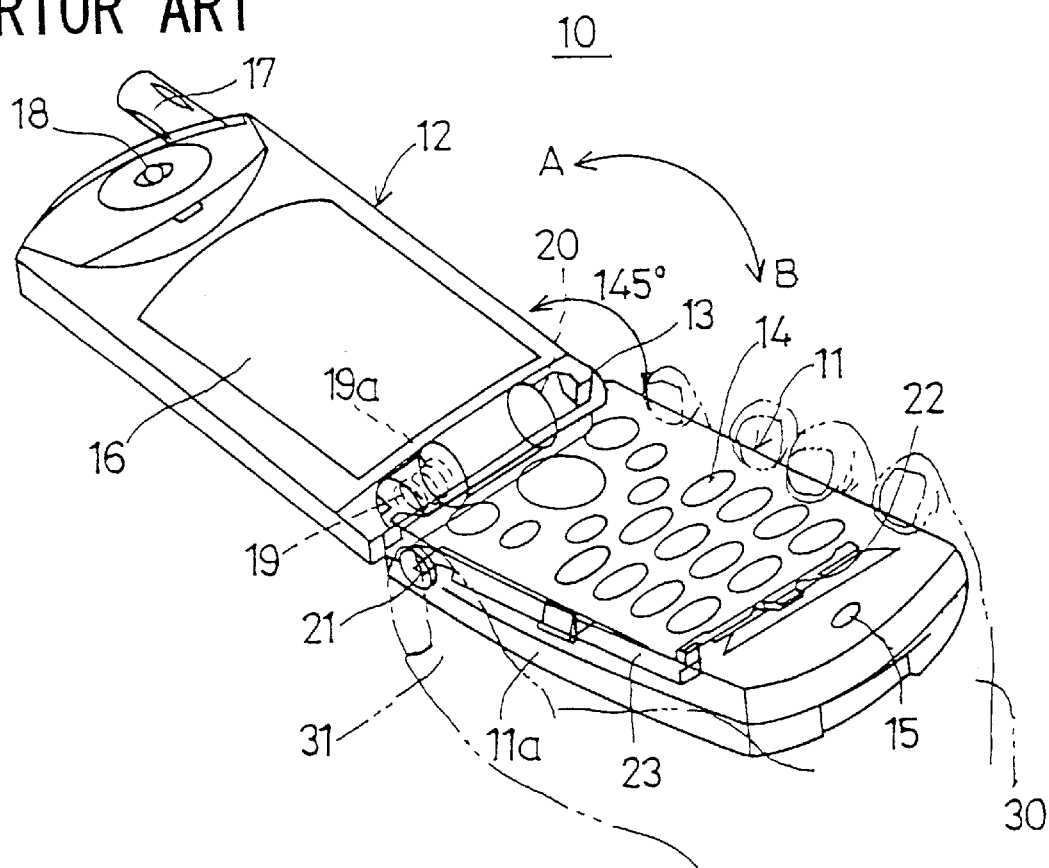
Figure 2A:
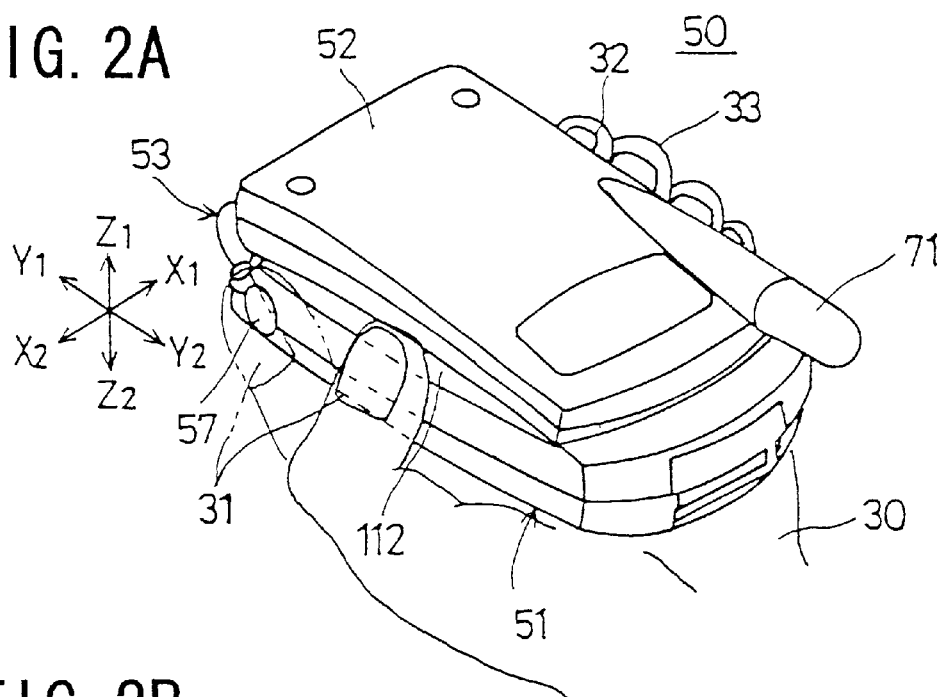
FIGS. 2A and 2B are perspective views of a folding portable telephone according to a first embodiment of the present invention in a folded state and in an unfolded state, respectively.
Figure 2B:
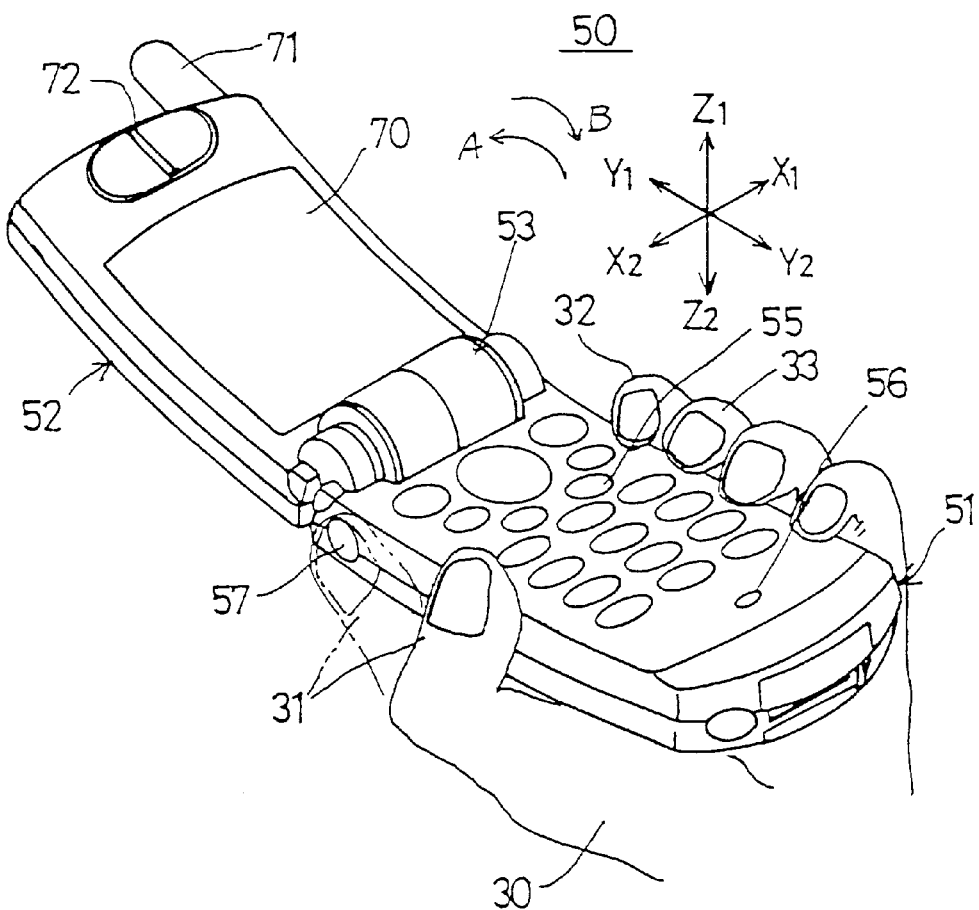
Figure 4:
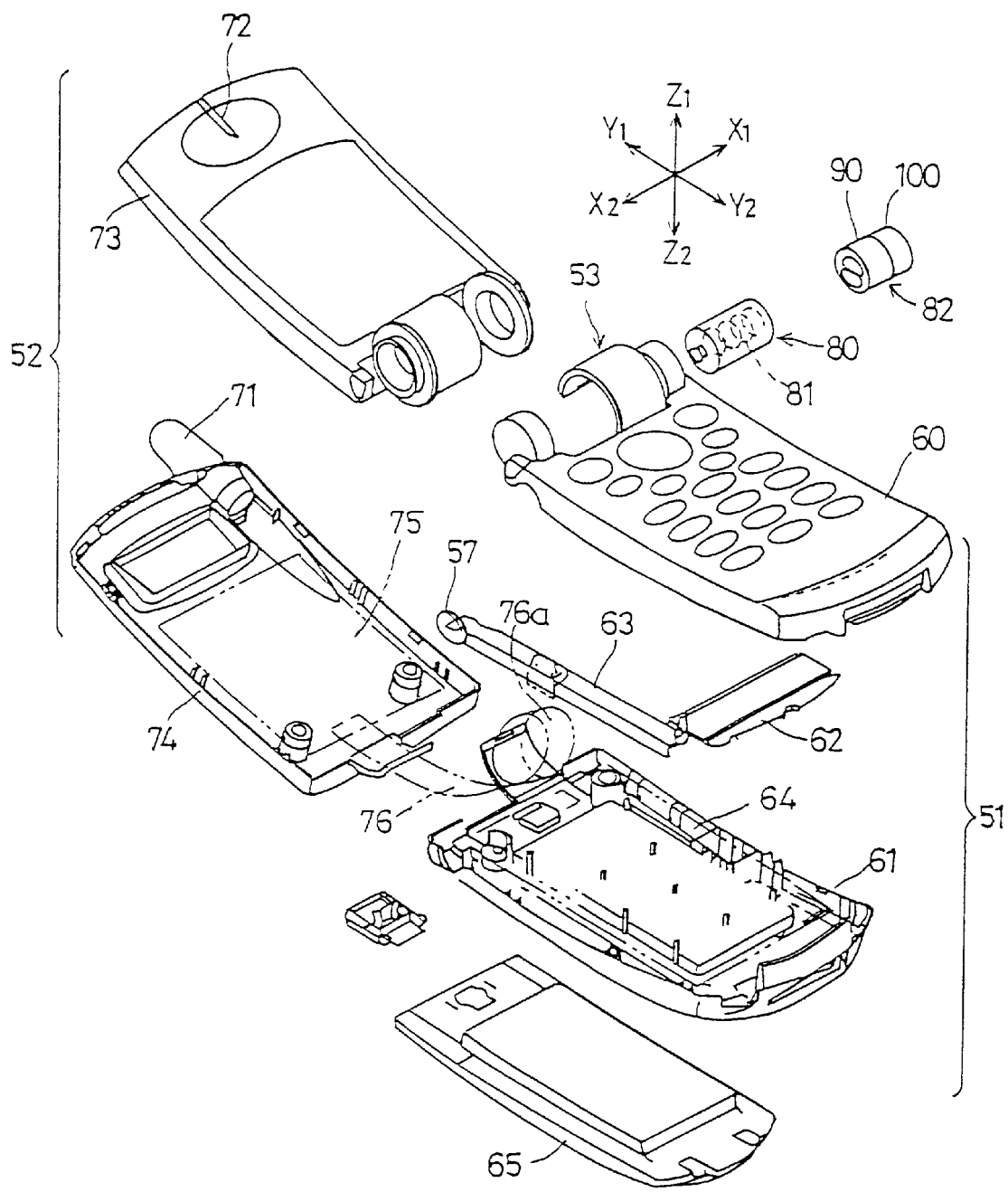
FIG. 4 is an exploded perspective view of the folding portable telephone according to the first embodiment of the present invention.

FIGS. 2A, 2B, 3A through 3D and 4 are diagrams showing a folding portable telephone 50 according to a first embodiment of the present invention. The folding portable telephone 50 is automatically unfolded by pushing a lock-release button 57. FIGS. 2A, 3A and 3B are a perspective view, a side elevational view and a front elevational view, respectively, of the folding portable telephone 50 in a folded state. FIGS. 2B and 3C are a perspective view and a side elevational view, respectively, of the folding portable telephone 50 in an unfolded state for making telephone conversations. FIG. 4 is an exploded perspective view of the folding portable telephone 50.

The folding portable telephone 50 includes a first housing 51 including operation buttons 55, a second housing 52 including a display section and a hinge 53 rotatably connecting the first and second housings 51 and 52. $X_1$–$X_2$ represents the axial direction of the hinge 53, and $Y_1$–$Y_2$ and $Z_1$–$Z_2$ represent the longitudinal direction and the vertical direction, respectively, of the folding portable telephone 50. The direction indicated by the arrow A in FIG. 2B is an opening direction in which the second housing 52 is opened up from the first housing 51, and the direction indicated by the arrow B in FIG. 2B is a closing direction in which the second housing 52 is closed down to the first housing 51.

Hereinafter, the directions indicated by the arrows A, B, X1, X2, Y1, Y2, Z1 and Z2 may be referred to as A, B, X1, X2, Y1, Y2, Z1 and Z2 directions, respectively.

The first housing 51 includes the operation buttons 55, a microphone 56 and the lock-release button 57. As shown in FIG. 4, the first housing 51 is disassembled in half into an upper housing portion 60 and a lower housing portion 61, and houses inside a printed-circuit board module 64, a lock claw 62, a rotation lever 63, etc. A battery 65 is attached to the bottom side of the first housing 51.

The second housing 52 includes a display panel 70, an antenna 71 and a speaker 72. As shown in FIG. 4, the second housing 52 is disassembled in half into an upper housing portion 73 and a lower housing portion 74, and houses inside a printed-circuit board module 75, etc.

The printed-circuit board modules 64 and 75 are connected by a flexible cable 76, which is looped inside the hinge 53 to form a spiral section 76a.

A hinge module 80 and a damper module 82, which forms a critical part of the present invention, are incorporated into the hinge 53.

A torsion coil spring 81 is incorporated into the hinge module 80. The torsion coil spring 81 has resilient force strong enough to open the second housing 52.

Figure 5:
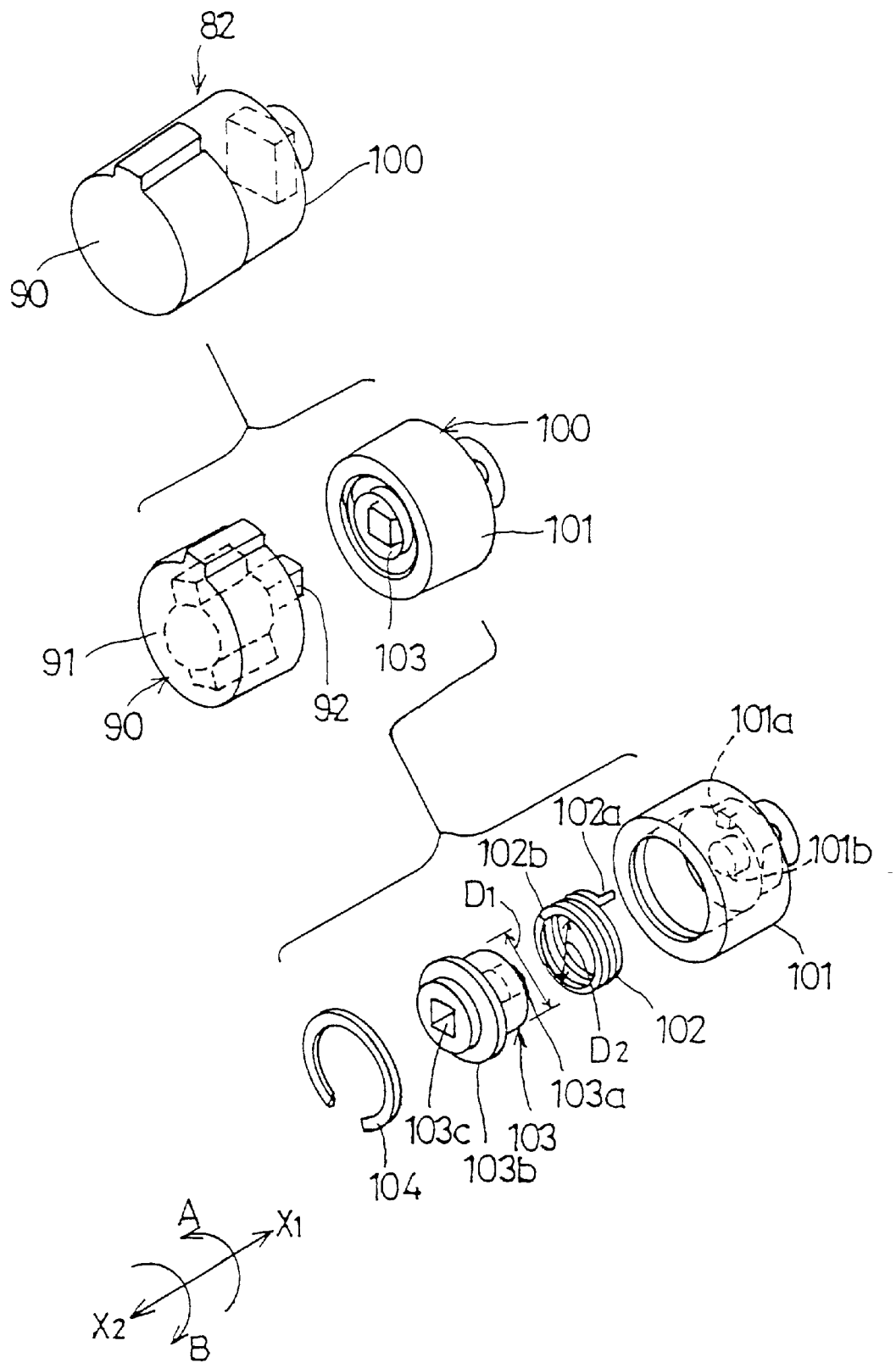
FIG. 5 is an exploded perspective view of a damper module employed in the first embodiment.

FIG. 5 is an exploded perspective view of the damper module 82. As shown in FIG. 5, an oil damper unit 90 and a unidirectional clutch unit 100 are coaxially connected to form the damper module 82.

When the folding portable telephone 50 is not in use, the second housing 52 is closed down to the first housing 51 as shown in FIGS. 2A and 3A, and is coupled to the first housing 51 by a lock mechanism 66 whose enlarged view is shown in FIG. 3A. The lock mechanism 66 has a structure wherein a concave portion 77 on the top end side of the second housing 52 engages the lock claw 62. The lock mechanism 66 provides a lock on the second housing 52 to securely keep the folding portable telephone 50 folded when the folding portable telephone 50 is not in use.

On the other hand, when the user makes telephone conversations, the user holds the first housing 51 of the folding portable telephone 50 in the palm of the left hand 30, and pushes the lock-release button 57 with the thumb 31 of the left hand 30. By this operation, the lock claw 62 is moved back inside by the rotation lever 63 to release the lock on the second housing 52, so that the second housing 52 is rotated, by the torsion coil spring 81 in the hinge module 80, in the A direction shown in FIG. 2B with respect to the first housing 51. As a result, the second housing 52 is opened by approximately 145 degrees up from the first housing 51 as shown in FIGS. 2B and 3C. Then, the user stretches out the antenna 71 and talks on the unfolded folding portable telephone 50 brought close to the face with the speaker 72 touching the ear.

When the telephone conversations are over, the user manually retracts the antenna 71 and rotates the second housing 52 in the B direction shown in FIG. 2B until the second housing 52 is coupled to the first housing 51 by the lock mechanism 66. Thus, the folding portable telephone 50 is folded as shown in FIGS. 2A and 3A.

A description will now be given of the damper module 82.

As shown in FIG. 5, the oil damper unit 90 includes a cylinder-like housing 91, of which the inside is filled with oil, and an axis member 92 with impeller blades. The axis member 92 with impeller blades protrudes in the $X_1$ direction from the cylinder-like housing 91. When the cylinder-like housing 91 rotates with respect to the axis member 92 with the impeller blades, the oil is stirred to generate viscous resistance.

Figure 6A:
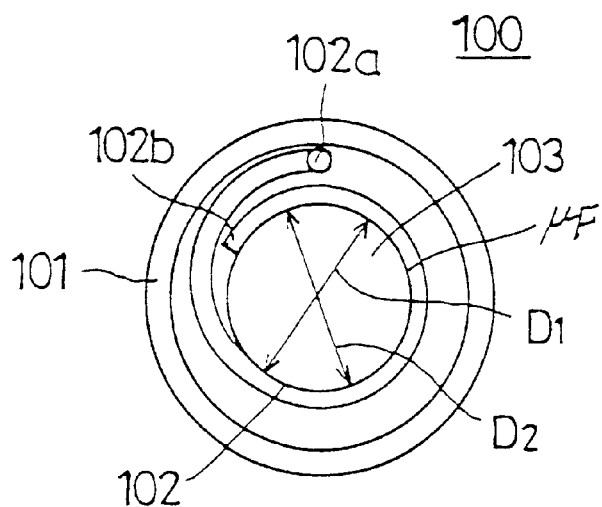
FIGS. 6A through 6C are cross-sectional views of a unidirectional clutch unit employed in the first embodiment, showing the operation thereof.
Figure 6B:
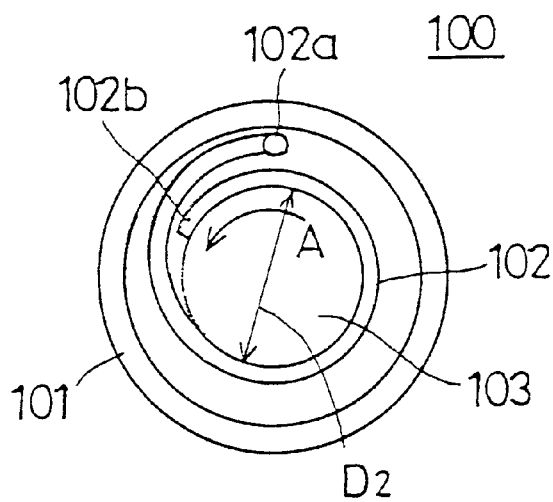
Figure 6C:
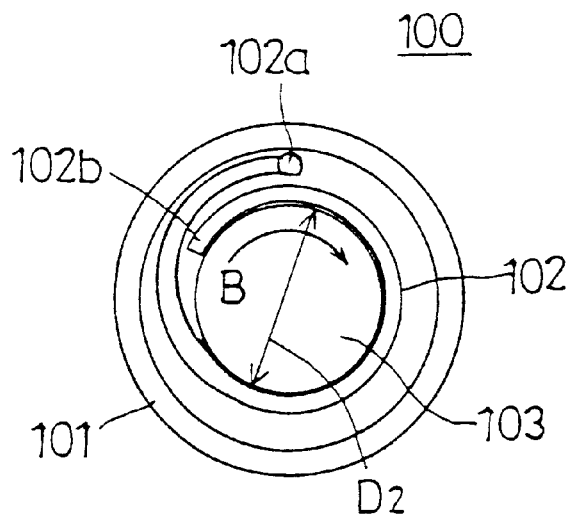

FIGS. 6A through 6C are cross-sectional views of the unidirectional clutch unit 100. As shown in FIGS. 5 and 6A through 6C, the unidirectional clutch unit 100 includes a cylindrical housing 101, a clutch coil spring 102 incorporated into the cylindrical housing 101 and a flanged axis member 103 inserted into the clutch coil spring 102 to be incorporated into the cylindrical housing 101. A washer 104 is attached to the opening of the cylindrical housing 101 so that the axis member 103 does not come off the cylindrical housing 101.

The axis member 103 includes a protruding portion 103a on the $X_1$-directional end, a flange portion 103b provided on the $X_2$-directional end portion and a square hole portion 103c formed in the $X_2$-directional end. The axis member 103 is rotatably supported in the center of the cylindrical housing 101 with the protruding portion 103a fit into a center hole 101b formed in the bottom of the cylindrical housing 101 and the flange portion 103b supported near the opening of the cylindrical housing 101.

The clutch coil spring 102 is tightly coiled and has an inside diameter $D_2$, which is substantially equal to the diameter $D_1$ of the axis member 103. The clutch coil spring 102 includes a fixing bent portion 102a on the $X_1$-directional end and a free end portion 102b on the $X_2$-directional end. The clutch coil spring 102 is coiled in a counterclockwise direction, or in the A direction in FIG. 5, toward the free end portion 102b from the bent portion 102a when viewed in the $X_1$ direction. The clutch coil spring 102 is fixed to the cylindrical housing 101 with the fixing bent portion 102a fit into an aperture 101a formed in the bottom of the cylindrical housing 101.

As shown in FIG. 6A, the outer surface of the axis member 103 remains in contact with the inner surface of the clutch coil spring 102 with the free end portion 102b simply touching the outer surface of the axis member 103. In other words, when the axis member 103 is rotated, the clutch coil spring 102 is twisted by frictional force $\mu F$ between the outer surface of the axis member 103 and the inner surface of the clutch coil spring 102.

The above-described unidirectional clutch unit 100 is suitably incorporated into the hinge 53 of the folding portable telephone 50 because the unidirectional clutch unit 100 can be simply formed of a small number of components so as to have a small diameter size.

As can be seen from FIG. 5, the axis member 92 with the impeller blades is shaped like a square pole to be fit into the square hole portion 103c of the axis member 103 so that the axis member 92 with the impeller blades and the axis member 103 rotate together as an integral unit.

The damper module 82 is incorporated into the hinge 53 with the oil damper unit 90 fixed to the second housing 52 and the unidirectional clutch unit 100 fixed to the first housing 51. More specifically, the cylinder-like housing 91 of the oil damper unit 90 is fixed to the second housing 52, and the cylindrical housing 101 of the unidirectional clutch unit 100 is fixed to the first housing 51.

A description will now be given of the unfolding and folding actions of the folding portable telephone 50, focusing especially on the operations of the hinge module 80 and the damper module 82.

When the second housing 52 is rotated in the A direction in FIG. 2B by the torsion coil spring 81, the oil damper unit 90 rotates in the A direction in FIG. 5, so that the axis member 92 with the impeller blades and the axis member 103 start to rotate in the A direction. However, as shown in FIG. 6B, when the axis member 103 rotates in the A direction, the clutch coil spring 102 is pulled by the above-mentioned frictional force $\mu F$ to rotate in the A direction as well. Fixed to the cylindrical housing 101 via the bent portion 102a, the clutch coil spring 102 then deforms so as to reduce the inside diameter $D_2$ and tighten up about the axis member 103. Therefore, the rotational movement of the axis member 103 is transmitted to the cylindrical housing 101 via the clutch coil spring 102. That is, the unidirectional clutch unit 100 is in a connected state wherein the axis member 103 and the cylindrical housing 101 are connected by a transmission path, through which the rotational movement of the axis member 103 is transmitted to the cylindrical housing 101.

The cylindrical housing 101 is fixed to the first housing 51, so that the rotational movement of the axis member 103 is restricted. Therefore, the rotational movement of the axis member 92 with the impeller blades is also restricted, so that the cylinder-like housing 91 stirs the oil and rotates against the viscosity thereof without the rotational movement of the axis member 92 with the impeller blades. The oil damper unit 90 thus functions as a damper so that the second housing 52 is slowly opened.

When the telephone conversations are over and the user rotates the second housing 52 in the closing direction indicated by the arrow B in FIG. 2B, the oil damper unit 90 rotates in the B direction in FIG. 5, so that the axis member 92 with the impeller blades and the axis member 103 start to rotate in the B direction. As shown in FIG. 6C, when the axis member 103 rotates in the B direction, the clutch coil spring 102 is pulled by the above-mentioned frictional force $\mu F$ to rotate in the B direction. Fixed to the cylindrical housing 101 via the bent portion 102a, the clutch coil spring 102 then deforms so as to enlarge the inside diameter D2 and loosen about the axis member 103. Therefore, the rotational movement of the axis member 103 is not transmitted to the clutch coil spring 102. That is, the unidirectional clutch unit 100 is in a disconnected state wherein the above-mentioned transmission path is cut off. Thus, the axis member 103 can rotate freely.

Since the axis member 92 with the impeller blades rotates together with the cylinder-like housing 91, the oil damper unit 90 does not function as a damper.

Therefore, the second housing 52 can be swiftly rotated in the closing direction indicated by the arrow B so that the folding portable telephone 50 can be folded quickly. Further, this closing action of the second housing 52 can be made with little force. The excellent operability of the folding portable telephone 50 is thus achieved.

Next, a description will be given of the appearance of the folding portable telephone 50.

As shown in FIGS. 2A and 3A, the first housing 51 is longitudinally shaped like an arc having a radius $R_1$ from a center in the $Z_1$ direction and the second housing 52 is longitudinally shaped like an arc having a radius $R_2$ from a center in the $Z_2$ direction. The radius $R_1$ is substantially equal to the radius $R_2$. Therefore, as shown in FIGS. 2B and 3C, the folding portable telephone 50 has its inner surface longitudinally curved like an arc having a radius $R_3$ in the unfolded state.

FIG. 3D is a cross-sectional view of the folding portable telephone 50 of FIG. 3A taken along the line D—D. As shown in FIG. 3D, a surface 110 of the first housing 51, on which the operation buttons 55 are provided, is curved to form an arc having a radius $R_{11}$ from a center in the $Z_2$ direction when viewing the X-Z plane. A surface 111 of the second housing 52, on which the display panel 70 is provided, is curved to form an arc having a radius $R_{12}$ from a center in the $Z_1$ direction when viewing the X-Z plane.

Particularly, as the folding portable telephone 50 is unfolded to have a curved shape like an arc as shown in FIGS. 2B and 3C, the folding portable telephone 50 nearly fits the ear-to-mouth facial outline of the user so that the pressure caused by the folding portable telephone 50 on the face of the user is distributed and weakened, which gives more comfort to the user during the use of the folding portable telephone 50. The weakened pressure prevents a portion of the face touching the folding portable telephone 50 from flushing easily even after long telephone conversations. The weakened pressure further prevents sweat or the like from the portion of the face touching the folding portable telephone 50 from getting easily thereinto. Moreover, as the outer surface of the folding portable telephone 50 is also curved, the folding portable telephone 50 fits the palm of the user, providing further comfort thereto.

According to the above-described structure of the folding portable telephone 50 providing more comfort to the user during the use thereof, spaces 112 and 113 for prying open the second housing 52 are formed between the first and second housings 51 and 52 on the $X_2$-directional and $X_1$-directional sides, respectively, as shown in FIGS. 2A, 3A and 3D. Each of the spaces 112 and 113 is formed to have a portion wide and deep enough for the user to insert the fingers into. Such a portion is hereinafter referred to as a finger-insertion portion. As shown in FIG. 3D, the finger-insertion portion of each of the spaces 112 and 113 has a V-shaped cross section when viewing the X-Z plane. Widths w in the $Z_1$–$Z_2$ direction of each of the openings of the spaces 112 and 113 range from 5 to 11 mm over the length of each of the finger-insertion portions.

The spaces 112 and 113 are formed as a result of shaping the folding portable telephone 50 like an arc. Therefore, there is no need to taper the longitudinal edge portions of the first and second housings 51 and 52. Thus, the spaces 112 and 113 can be formed without reducing the volume of the first and second housings 51 and 52.

Next, a description will be given of a structure for unfolding the folding portable telephone 50 without pushing the lock-release button 57 and of the operation of the folding portable telephone 50 having such a structure.

The above-described structure includes the lock mechanism 66 and the spaces 112 and 113. The lock mechanism 66 includes the lock claw 62 having a tapered portion 62a on its top end. The lock claw 62 is pressed by a spring 67. Therefore, when force is applied to the second housing 52 in its opening direction, the second housing 52 pushes up a slope of the tapered portion 62a. As a result, the lock claw 62 is pushed back so that the lock on the second housing 52 is released.

As described above, the spaces 112 and 113 are formed between the first and second housings 51 and 52 so that the fingers of the user can be inserted thereinto.

In order to unfold the folding portable telephone 50 without pushing the lock-release button 57, the user first puts the first housing 51 on the palm of the left hand 30 and holds the first housing 51 by the left hand 30. Then, as shown in FIGS. 2A and 3D, the user inserts the thumb 31 of the left hand 30 into the space 112 and other fingers of the left hand 30 such as an index finger 32 and a middle finger 33 into the space 113. The user moves the above-mentioned fingers in the respective spaces 112 and 113 between the first and second housings 51 and 52 so as to pry open the second housing 52. By this movement of the fingers, the second housing 52 is pushed up in a direction away from the first housing 51, namely, in a direction indicated by the arrow C in FIG. 3D so as to be forcibly rotated to some extent.

By forcibly pushing back the lock claw 62, the second housing 52 is rotated so as to release the lock provided by the lock mechanism 66 on the second housing 52.

When the folding portable telephone 50 is folded as shown in FIG. 2A, the width w of each of the openings of the spaces 112 and 113 longitudinally narrows by degrees from the center portion of the opening in the $Y_2$ direction.

The width w is wide enough for a relatively large thumb at the center portion of the opening. Therefore, irrespective of the size of the thumb 31, the second housing 52 can be pried open up from the first housing 51 by moving the thumb 31 so as to push up the second housing 52 at a desired position in the space 112, to which the thumb 31 is slid after being inserted into the center portion of the opening thereof. That is to say, whether the size of the thumb 31 is large or small, the user can pry open the second housing 52 up from the first housing 51.

After being rotated until the lock provided by the lock mechanism is released, the second housing 52 is rotated in the A direction by the torsion coil spring 81 inside the hinge module 80, so that the folding portable telephone 50 is unfolded as shown in FIG. 2B.

As described above, the second housing 52 can be forcibly rotated with a single hand, instead of both hands, with respect to the first housing 51 until the lock provided by the lock mechanism is released. Therefore, the folding portable telephone 50 is provided with excellent operability.

A description will now be given of a second embodiment of the present invention.

Figure 7A:
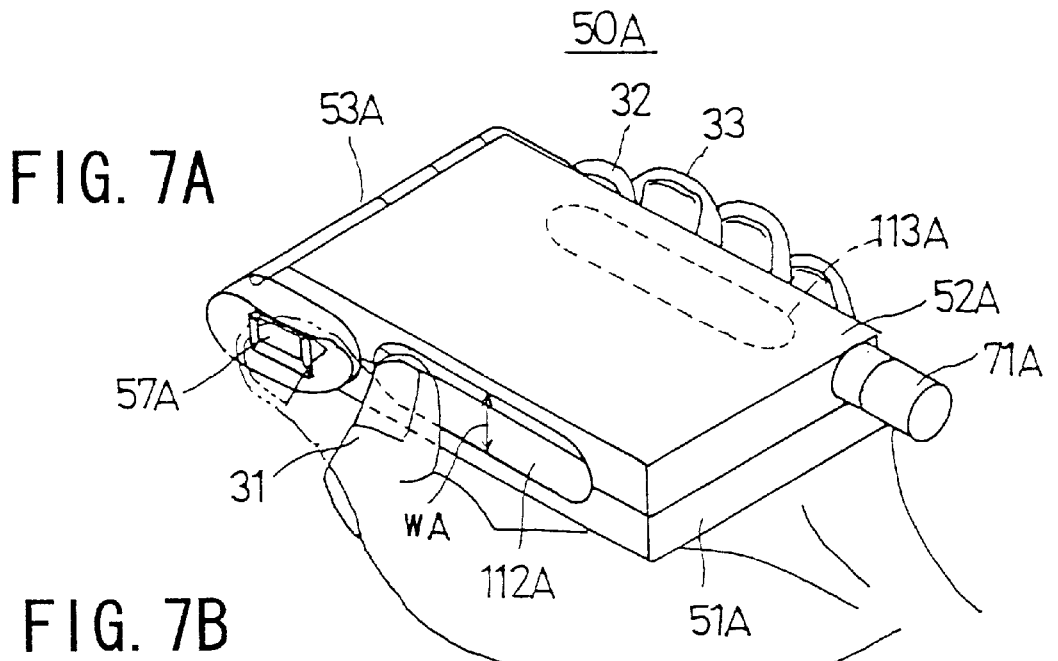
FIGS. 7A and 7B are perspective views of a folding portable telephone according to a second embodiment of the present invention in a folded state and in an unfolded state, respectively.
Figure 7B:
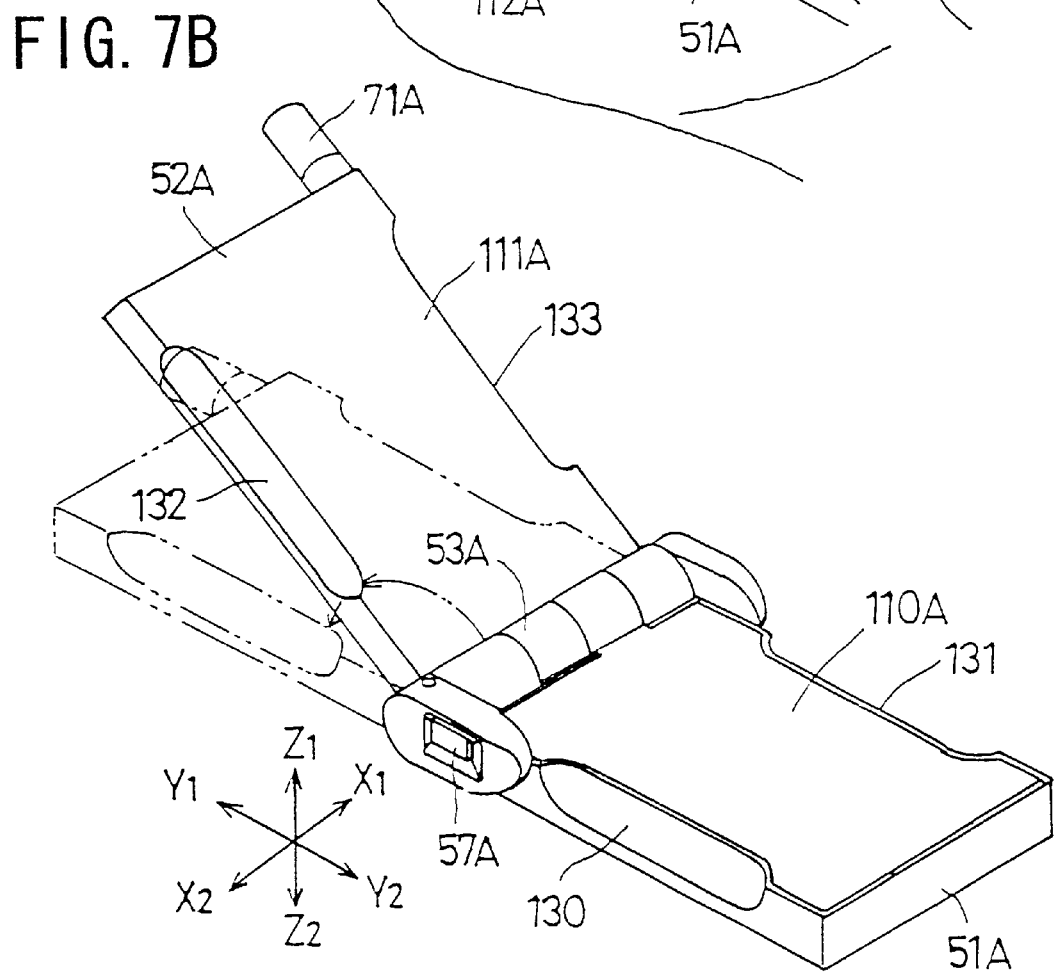
Figure 8:
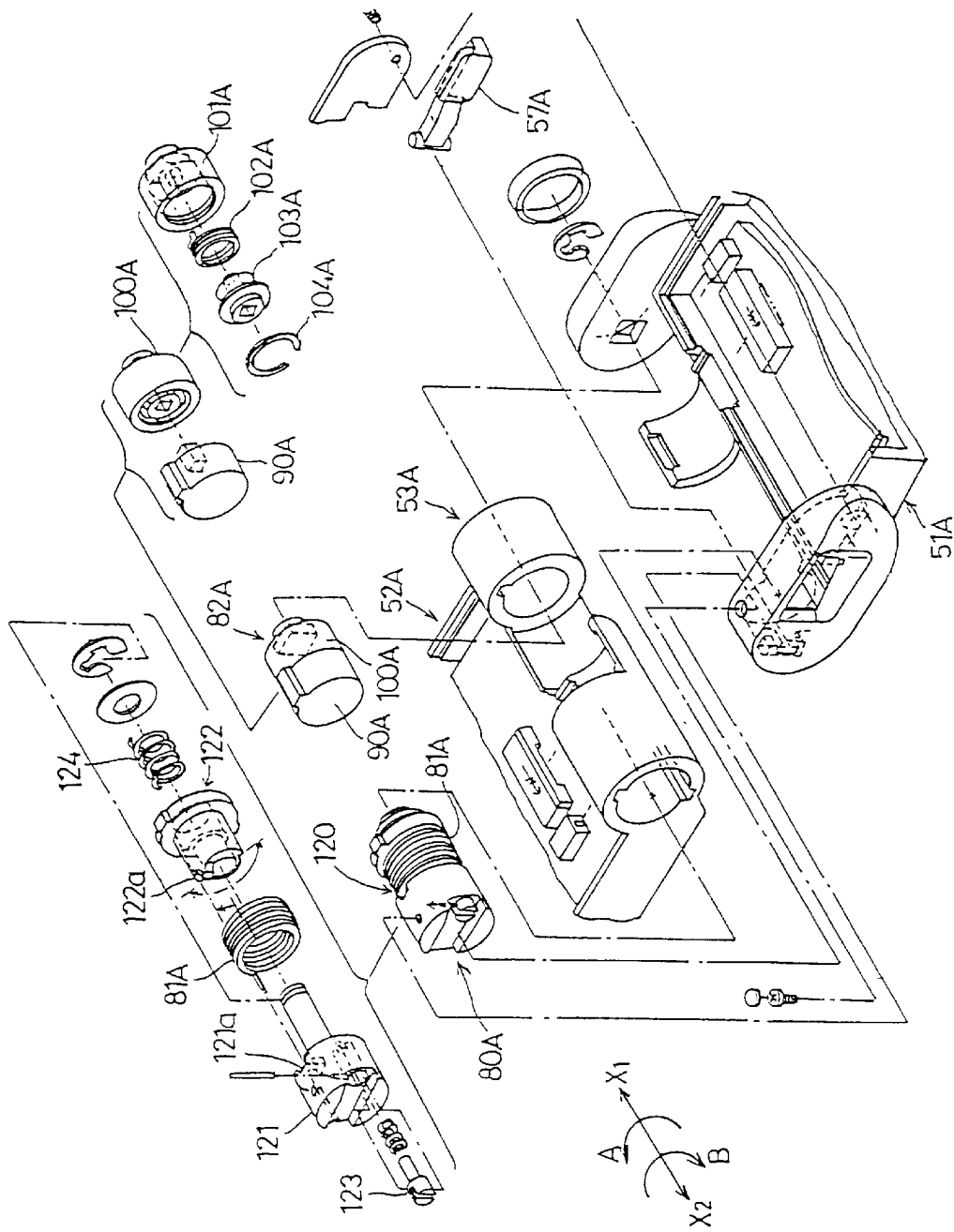
FIG. 8 is an exploded perspective view of a hinge employed in the second embodiment, showing an internal structure thereof.

FIGS. 7A and 7B are diagrams showing a folding portable telephone 50A according to the second embodiment of the present invention. The folding portable telephone 50A is automatically unfolded by pushing a lock-release button 57A. FIG. 7A is a perspective view of the folding portable telephone 50A in a folded state, and FIG. 7B is a perspective view of the folding portable telephone 50 in an unfolded state. FIG. 8 is an exploded perspective view of a hinge 53A showing an internal structure thereof. The folding portable telephone 50A substantially has the same structure as the folding portable telephone 50 shown in FIGS. 2A, 2B and 3A through 3D except for a lock mechanism corresponding to the lock mechanism 66 of the folding portable telephone 50 and spaces corresponding to the spaces 112 and 113 thereof. Therefore, the elements of the folding portable telephone 50A which correspond to those of the folding portable telephone 50 are referred to by the same numerals with a letter "A", and a description thereof will be omitted.

The folding portable telephone 50A includes a first housing 51A including operation buttons, a second housing 52A including a display section and the hinge 53A rotatably connecting the first and second housings 51A and 52A. A damper module 82A is incorporated into the hinge 53A.

As shown in FIG. 8, a hinge module 80A includes a lock mechanism 120. The lock mechanism 120 includes an axis member 121 fixed to the first housing 51A and a cam member 122 fixed to the second housing 52A. The lock mechanism 120 provides a lock on the second housing 52A when a trapezoidal lock claw 122a of the cam member 122 is fit into a concave portion 121a of the axis member 121. The lock mechanism is provided inside the hinge 53A.

When the lock-release button 57A is pushed in a state shown in FIG. 7A, a tension pin 123 pushes back the cam member 122 in the $X_1$ direction against the resilient force of a spring 124, so that the trapezoidal lock claw 122a is pulled out of the concave portion 121a. The lock on the second housing 52A is thus released.

As shown in FIG. 7B, arc-like concave portions 130 and 131 are formed on the X2-directional and X1-directional edge portions, respectively, of the first housing 51A on the side of a surface 110A thereof. On the other hand, arc-like concave portions 132 and 133 are formed on the X2-directional and X1-directional end portions, respectively, of the second housing 52A on the side of a surface 111A thereof. According to this structure, spaces 112A and 113A for prying open the second housing 52A are formed between the first and second housings 51A and 52A on the X2-directional and X1-directional sides of the folding portable telephone 50A when the folding portable telephone 50A is folded as shown in FIG. 7A. Each of the spaces 112A and 113A is formed to have a portion wide and deep enough for the user to insert the fingers into. Such a portion is hereinafter referred to as a finger-insertion portion. The finger-insertion portion of each of the spaces 112A and 113A has a U-shaped cross section when viewing the X-Z plane. Widths wA in the $Z_1$–$Z_2$ direction of each of the openings of the spaces 112A and 113A range from 5 to 11 mm over the length of each of the finger-insertion portions.

As shown in FIG. 7A, the user puts the first housing 51A on the palm of the left hand 30 and holds the first housing 51A by the left hand 30. Then, the user inserts the thumb 31 of the left hand 30 into the space 112A and other fingers of the left hand 30 such as the index finger 32 and the middle finger 33 into the space 113A. The user moves the above-mentioned fingers in the respective spaces 112A and 113A between the first and second housings 51A and 52A so as to pry open the second housing 52A. By this movement of the fingers, the second housing 52A is pushed up in a direction away from the first housing 51A so as to be forcibly rotated to some extent. At this point, the slopes of the trapezoidal lock claw 122a are guided along the edge of the concave portion 121a, so that the trapezoidal lock claw 122a is forcibly pulled out of the concave portion 121a. The lock on the second housing 52A is thus released. After the lock is released, the second housing 52A is rotated in the A direction by a torsion coil spring 81A inside the hinge module 80A, so that the folding portable telephone 50A is unfolded as shown in FIG. 7B.

A description will now be given of a third embodiment of the present invention.

Figure 9A:
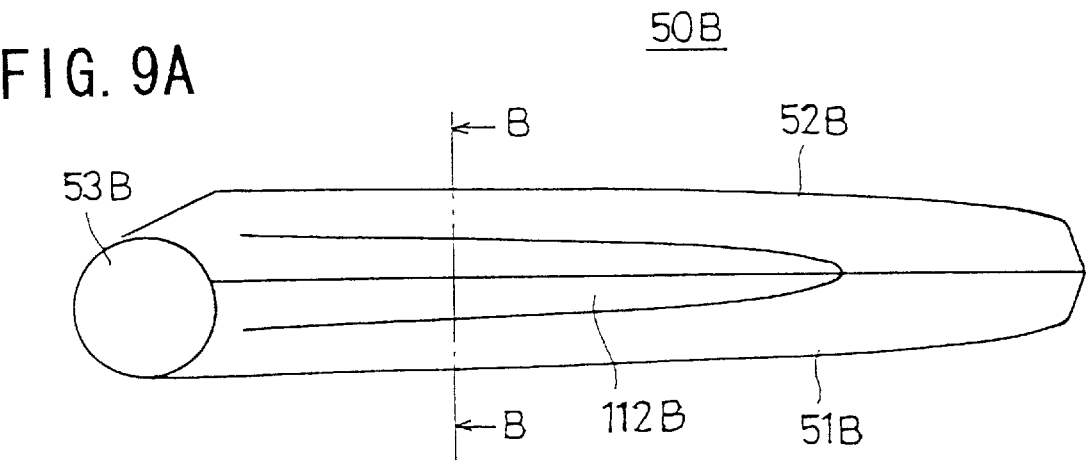
FIG. 9A is a side elevational view of a folding portable telephone according to a third embodiment of the present invention.
Figure 9B:
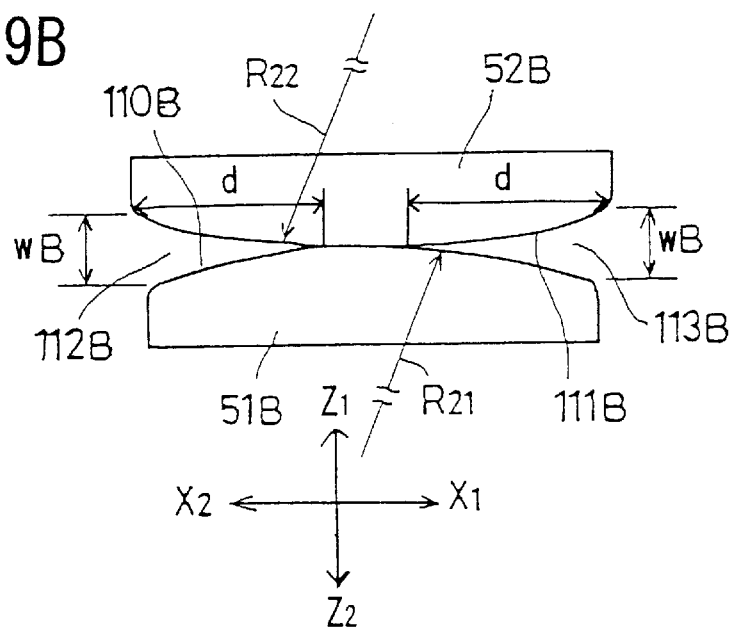
FIG. 9B is a cross-sectional view of the folding portable telephone of FIG. 9A taken along the line B—B.

FIG. 9A is a side elevational view of a folding portable telephone 50B according to the third embodiment of the present invention. FIG. 9B is a cross-sectional view of the folding portable telephone 50B of FIG. 9A taken along the line B—B.

The folding portable telephone 50B includes a first housing 51B including operation buttons, a second housing 52B including a display section and a hinge 53B rotatably connecting the first and second housings 51B and 52B.

As shown in FIG. 9B, a surface 110B of the first housing 51B, on which the operation buttons are provided, is curved to form an arc having a radius $R_{21}$ from a center in the $Z_2$ direction when viewing the X-Z plane. A surface 111B of the second housing 52B, on which a liquid crystal panel is provided, is curved to form an arc having a radius $R_{22}$ from a center in the $Z_1$ direction when viewing the X-Z plane.

By thus curving the surfaces 110B and 111B, spaces 112B and 113B for prying open the second housing 52B are formed between the first and second housing 51B and 52B on the $X_2$-directional and $X_1$-directional sides of the folding portable telephone 50B when the folding portable telephone 50B is folded. Each of the spaces 112B and 113B is formed to have a portion wide and deep enough for the user to insert the fingers into. Such a portion is hereinafter referred to as a finger-insertion portion. The finger-insertion portion of each of the spaces 112B and 113B has a V-shaped cross section when viewing the X-Z plane. Widths wB in the $Z_1$–$Z_2$ direction of each of the openings of the spaces 112B and 113B range from 5 to 11 mm over the length of each of the finger-insertion portions, and depths d in the X1–X2 direction of each of the openings thereof are equal to or more than 5 mm.

As in the previously described embodiments, by using the spaces 112B and 113B, the second housing 52B is pushed up in a direction away from the first housing 51B so as to be forcibly rotated to some extent.

The present invention is not limited to the specifically disclosed embodiments, and variations and modifications may be made without departing from the scope of the present invention. For example, a folding portable telephone according to the present invention is not necessarily required to be automatically unfolded, and may be manually unfolded. Also, spaces for forcibly unfolding a folding portable telephone can be formed by forming slopes or arc-like surfaces on only either one of a housing including operation buttons and a housing including a display section of the folding portable telephone. Further, a damper module can be formed so that an oil damper unit is fixed to a housing including operation buttons, and a unidirectional clutch unit is fixed to a housing including a display section. Moreover, an independent oil damper unit and an independent unidirectional clutch unit can be individually incorporated to be connected as an integral unit.

The present application is based on Japanese priority application No. 11-348148 filed on Dec. 7, 1999, the entire contents of which are hereby incorporated by reference.

What is claimed is:

1. A folding portable telephone comprising:
   a first housing to be held in a hand of a user;
   a hinge attached to one end of said first housing;
   a second housing movably supported by said hinge;
   a damper unit incorporated into said hinge; and
   a unidirectional clutch unit incorporated into said hinge,
   wherein said unidirectional clutch unit is connected to said damper unit so as to allow said damper unit to generate given resistance with respect to a rotational movement of said second housing when said second housing is rotated in an opening direction thereof, and to prevent said damper unit from generating the given resistance with respect to the rotational movement thereof when said second housing is rotated in a closing direction thereof.

2. The folding portable telephone as claimed in claim 1, wherein said unidirectional clutch unit comprises:
   a housing;
   a clutch coil spring provided inside said housing with one end portion of said clutch coil spring fixed to said housing; and
   an axis member which remains in contact with an inner surface of said clutch coil spring so as to be rotatably supported inside said housing,
   said housing and said axis member being connected by a transmission path which transmits a rotational movement of said axis member to said housing when said clutch coil spring deforms in such a direction as to reduce a diameter thereof, and being disconnected by cutting off the transmission path when said clutch coil spring deforms in such a direction as to enlarge the diameter.

3. The folding portable telephone as claimed in claim 1, further comprising a space on each of respective longitudinal sides between said first and second housings when the folding portable telephone is folded so that said second housing is pried open by inserting a finger of the user into each of the spaces.

4. The folding portable telephone as claimed in claim 3, wherein the spaces are formed by arc-like shapes of said first and second housings, said arc-like shapes integrally forming an arc-like shape when the folding portable telephone is unfolded.

5. The folding portable telephone as claimed in claim 3, wherein the spaces are formed by arc-like surfaces of said first and second housings when the folding portable telephone is folded.

6. A folding portable telephone comprising:
   a first housing to be held in a hand of a user;
   a hinge attached to one end of said first housing;
   a second housing movably supported by said hinge;
   a damper unit incorporated into said hinge;
   a unidirectional clutch unit incorporated into said hinge;
   a lock mechanism which provides a lock on said second housing to keep said second housing closed down to said first housing, the lock being released when said second housing is pried open;
   a spring which presses said second housing in an opening direction thereof; and
   a space on each of respective longitudinal sides between said first and second housings when the folding portable telephone is folded so that said second housing is pried open by inserting a finger of the user into each of the spaces,
   wherein said unidirectional unit is connected to said damper unit so as to allow said damper unit to generate given resistance with respect to a rotational movement of said second housing when said second housing is rotated in an opening direction thereof, and to prevent said damper unit from generating the given resistance with respect to the rotational movement thereof when said second housing is rotated in a closing direction thereof.

7. The folding portable telephone as claimed in claim 6, wherein one of said first and second housings is shaped like an arc so as to form the spaces.

8. The folding portable telephone as claimed in claim 6, wherein the spaces are formed by arc-like shapes of said first and second housings, said arc-like shapes integrally forming an arc-like shape when the folding portable telephone is unfolded.

9. The folding portable telephone as claimed in claim 6, wherein the spaces are formed by arc-like surfaces of said first and second housings when the folding portable telephone is folded.

10. The folding portable telephone as claimed in claim 6, wherein the spaces are formed by concave portions formed on respective longitudinal sides of said first and second housings.

11. A folding portable telephone comprising:
    a first housing to be held in a hand of a user;
    a hinge attached to one end of said first housing; and
    a second housing movably supported by said hinge,
    wherein a space is formed on each of respective longitudinal sides between said first and second housings when the folding portable telephone is folded so that said second housing is pried open by inserting a finger of the user into each of the spaces; the space extending from a periphery of said hinge to a periphery of an end of the folding portable telephone which end is opposite to said hinge.

12. The folding portable telephone as claimed in claim 11, wherein one of said first and second housings is shaped like an arc so as to form the spaces.

13. The folding portable telephone as claimed in claim 11, wherein the spaces are formed by arc-like shapes of said first and second housings, said arc-like shapes integrally forming an arc-like shape when the folding portable telephone is unfolded.

14. The folding portable telephone as claimed in claim 11, wherein the spaces are formed by arc-like surfaces of said first and second housings when the folding portable telephone is folded.

15. The folding portable telephone as claimed in claim 11, wherein the spaces are formed by concave portions formed on respective longitudinal sides of said first and second housings.

16. A folding portable telephone comprising:
    a first housing to be held in a hand of a user;
    a hinge attached to one end of said first housing;
    a second housing movably supported by said hinge;
    a lock mechanism which provides a lock on said second housing to keep said second housing closed down to said first housing, the lock being released when said second housing is pried open; and a spring which presses said second housing in an opening direction thereof, wherein each of said first and second housings is shaped like an arc so as to form a space on each of respective longitudinal sides between said first and second housings when the folding portable telephone is folded so that said second housing is pried open by inserting a finger of the user into each of the spaces.

17. The folding portable telephone as claimed in claim 12, wherein said lock mechanism is provided to said hinge.

* * * * *